Feb. 10, 1931.          J. SNEED          1,791,644
SECURING DEVICE
Filed Oct. 1, 1928          2 Sheets-Sheet 1

Patented Feb. 10, 1931

1,791,644

UNITED STATES PATENT OFFICE

JOHN SNEED, OF FERNDALE, MICHIGAN, ASSIGNOR TO THE MIDLAND STEEL PRODUCTS COMPANY, OF CLEVELAND, OHIO, A CORPORATION OF OHIO

SECURING DEVICE

Application filed October 1, 1928. Serial No. 309,665.

This invention relates to vehicle brake linkage and more particularly to a bracket or device for securing one end of a conduit part of the linkage to the frame of the vehicle.

In brake linkage where flexible conduits are used with wire or cable to transmit forces from the vehicle chassis to the brakes on the axles, the conduits may be compressed in amount substantially equal to the tension placed upon the cable for actuating the brakes. It follows that each conduit must be rigidly secured at one end to a fixed part of the brake and at the other end to the chassis, preferably to the side rail of the vehicle frame. Various kinds of brackets have been used to clamp the end of the conduit to the side rail, and one of the difficult and uneconomic factors in securing the bracket to the side rail, has been in matching the plurality of rivet holes necessary to firmly secure the bracket. When brackets have finally been attached to the side rail, there followed the additional problem of securing the end of the conduit to the bracket, and while various means have been used, it is among the objects of my invention to simplify this whole structure to avoid need for matching rivet holes; to clamp the conduit and bracket by the same means; to provide an assembly which is very simple in construction and which may be very readily and cheaply used. Generally stated my objects include the provision of a connection between the end of the conduit and the chassis, which will endure and which may have sufficient strength to eliminate fear of failure of the brakes by reason of the failure of such a connection.

Other objects will appear from the following description of a preferred form of my invention, reference being had to the accompanying drawings. The essential characteristics are summarized in the claims.

Figure 1:
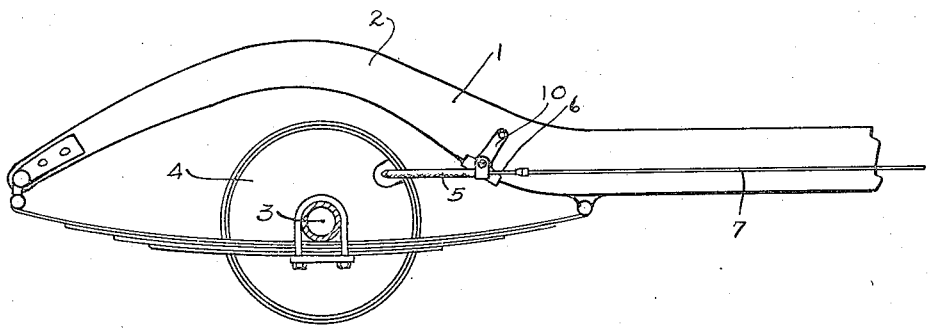
Figure 2:
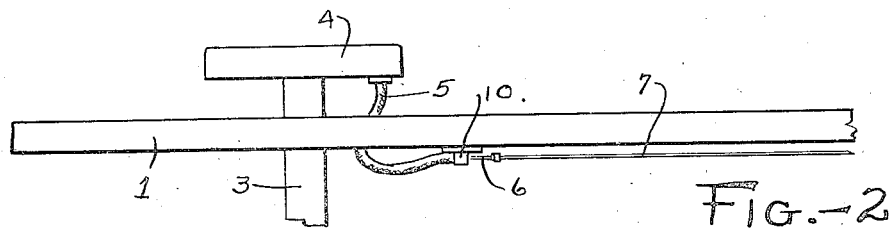
Figure 3:
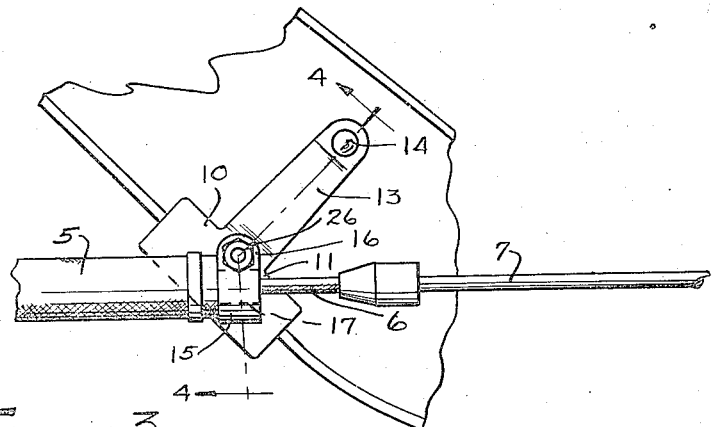
Figure 5:
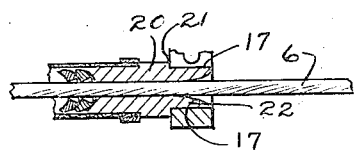
Figure 4:
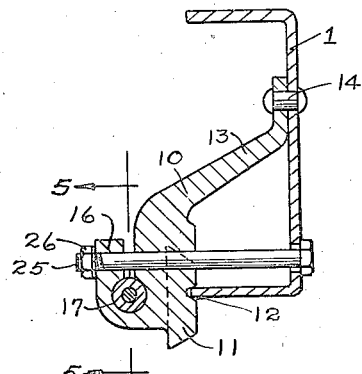
Figure 6:
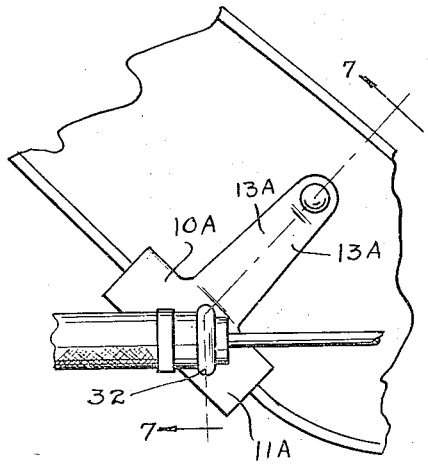
Figure 7:
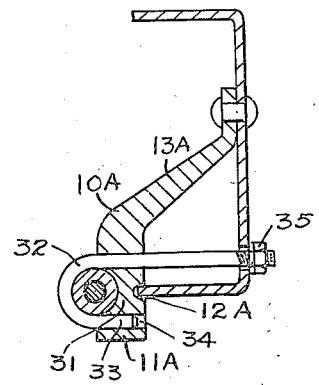
Figure 8:
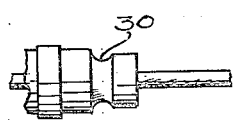

In the drawings, Fig. 1 is a fragmentary and partially diagrammatic elevation of one side rail of a vehicle frame along with a brake and vehicle axle; Fig. 2 is a top plan of the part shown in Fig. 1; Fig. 3 is an enlarged elevation of the assembly constituting the means for clamping the end of the flexible conduit to the side rail of the vehicle frame; Fig. 4 is a section taken along the line 4—4 of Fig. 3; Fig. 5 is a section taken along the line 5—5 of Fig. 4 and constitutes a broken section of the end of the conduit; Figs. 6 and 7 illustrate a modified form of the attaching means illustrated in Figs. 3 and 4; and Fig. 8 illustrates a modified form of the end unit of the conduit used with brackets and clamping device of Figs. 6 and 7.

Referring particularly to Figs. 1 and 2, there is illustrated the rearward part of the left side rail 1 of a motor vehicle having a "kick-up" 2 over the rear axle 3. The brake 4 is carried on the end of the axle and is actuated through a flexible conduit 5 which houses a cable 6. The cable is connected to a brake pull rod 7 which is drawn by the foot pedal or other means through appropriate linkage, not shown. It suffices to say that the pull rod delivers forces in tension to the cable 6 which are transmitted through the conduit for actuating the brake. The forces in tension in the cable are equal and opposite to the forces in compression in the conduit so that the end of the conduit which is secured to the side rail is forced forwardly of the vehicle or to the right as viewed in Figs. 1 and 2 when the brakes are applied.

To hold the end of the conduit against movement relative to the side rail means including a bracket 10 are provided. Referring particularly to Figs. 3, 4 and 5, the bracket 10 is T-shaped having a head part 11 which lies along and parallel to the lower flange of the side rail and is grooved throughout its length as at 12 to engage the edge of the lower flange of the side rail. The notch or groove 12 has inclined walls so that the edge of the side rail is caught and wedged therebetween. Corresponding to the body of the T is an arm 13 which extends inwardly to the web of the side rail and is secured thereto by such means as a bolt or rivet 14.

As will appear from the drawings, the bracket is affixed to the side rail where the rail is inclined in the formation of the "kick-up" and the head of the bracket and the arm are inclined from the horizontal and vehicle respectively. In positioning the conduit between the brake and side rail, it may be expedient that the conduit lie in a horizontal plane so that the part of the bracket engaging the conduit is disposed generally vertically and inclined relative to the other parts of the bracket. Thus there is formed integrally with the bracket a clamping part 15 which comprises a jaw 16 spaced from the body of the bracket at its upper end and defining with the body of the bracket a cylindrical horizontally extending aperture 17, which receives the end of the conduit 6.

Referring particularly to Fig. 5, the end of the conduit may comprise a member 20 having an annular shoulder 21 and a cylindrical part 22 which lies within the aperture 17 of the bracket and is clamped therein against movement. The shoulder 21 bears against the body of the bracket and transmits forces in compression thereto. Extending through the body of the bracket and through the upper end of the jaw 16 is a bolt 25 which also extends through the web of the side rail. The aperture in the side rail through which the bolt 25 passes may be of greater size than the bolt to eliminate the need for matching holes. The duty on the bolt is purely in tension and movement of the bracket is resisted by the wedge grip on the edge of the lower flange and by the engagement of the end of the arm 13 with the web of the rail through the rivet 14. A nut 26 with a suitable lock washer is threaded on the end of the bolt 25 and serves to draw the parts into fixed and clamped position. Forces which tend to slide the bracket along the side rail are converted into forces tending to rotate the bracket around the rivet 14 as a center and such forces are resisted by the lower side flange of the side rail acting through the groove 12. The bolt 25 is not loaded in shear and need not have close lateral engagement with the web of the side rail.

Referring particularly to Figs. 6, 7 and 8, I illustrate a modification wherein the T-shaped bracket 10a has a head part 11a with the groove 12a engaging the lower side flange of the side rail, and has an arm 13a secured to the web of the side rail in the manner mentioned above. In this instance, I form the end member of the conduit with an annular groove 30 and provide an arcuate projection 31 in the body of the bracket complementary to part of the groove 30 and pass a J-shaped bolt 32 around the end member and within the groove 30 to clamp the end of the conduit relative to the bracket. The short end 33 of the J-shaped bolt 32 extends into an aperture in the head of the bracket as at 34 and the long end of the J-shaped bolt passes through the bracket and through the web of the side rail 30. Suitable means such as a nut 35 with a lock washer clamp the whole assembly together and wedge the edge of the lower side flange into the groove 12a and secure the end of the conduit in fixed relation to the bracket and to the side rail.

While the foregoing has been a description of a prepared form of my invention and one modification thereof, I do not care to be limited to the specific showing, or in any manner other than by the claims appended hereto.

I claim:

1. The combination of a channel shaped side rail, a part to be held in fixed relation thereto, a bracket engaging an edge of the flange of the side rail and having a clamping portion surrounding said part to be secured and a bolt extending through the bracket and through the web of the side rail for clamping said part within the bracket and for drawing the bracket against the edge of the side rail.

2. The combination of a channel shaped side rail, a part to be held in fixed relation thereto, a bracket having a grooved part engaging an edge of the flange of the side rail and having a clamping portion surrounding said part to be secured and a bolt extending through the bracket and through the web of the side rail for clamping said part within the bracket and for wedging the grooved part of the bracket over the edge of the side rail.

3. The combination of a channel shaped side rail, a flexible conduit having an end part to be held in fixed relation thereto, a T-shaped bracket having a groove in the part corresponding to the head of the T and engaging the edge of the flange of the side rail and having an arm corresponding to the body of the T secured at its end with the web of the side rail, the head of the bracket having a portion arranged to receive the end of the conduit and means for clamping the conduit to the bracket and for forcing the edge of the side flange into the groove in the head of the bracket.

4. The combination of a channel shaped side rail, a flexible conduit having an end part to be held in fixed relation thereto, a T-shaped bracket having a groove in the part corresponding to the head of the T and engaging the edge of the flange of the side rail and having an arm corresponding to the shaft of the T secured at its end to the web of the side rail, the head of the bracket having a portion arranged to receive the end of the conduit and means comprising a bolt extending through the bracket adjacent the end of the conduit and passing through the web of the side rail for clamping the conduit to the bracket and for forcing the edge of the side flange into said groove.

5. The combination of a channel part, a bracket secured to said part and adapted to be loaded with forces parallel to the web of the channel part, said bracket having a portion extending along the edge of the flange of the channel part and contacting with opposite sides thereof, said bracket also comprising an arm secured at its end to the web of the channel part at a point spaced from said side flange, whereby forces delivered to the portion of the bracket near the side flange tend to rotate the bracket about the end of its arm while the bracket is held against rotation by engagement with said side flange.

6. The combination of a channel part, a bracket secured to said part and adapted to be loaded with forces parallel to the web of the channel part, said bracket having a portion extending along the edge of the flange of the channel part and having a V-shaped groove into which the edge of the flange is jammed, said bracket also comprising an arm secured at its end to the web of the channel part at a point spaced from said side flange, whereby forces delivered to the portion of the bracket near the side flange tend to rotate the bracket about the end of its arm while the bracket is held against rotation by engagement with said side flange.

7. The combination of a channel shaped member and a bracket intended to be fixed to said member, said bracket comprising a grooved head engaging one of the side flanges of the channel member, and an arm extending at right angles to the head part and secured at its end to the channel member adjacent the other side flange thereof.

8. The combination of a channel shaped member and a bracket intended to be fixed to said member, said bracket comprising a grooved head engaging the edge of one of the side flanges of the channel member, an arm extending at right angles to the head part and secured at its end to the channel member adjacent the other side flange thereof, and means for holding said grooved head upon the edge of said side flange.

9. The combination of the side rail of a vehicle frame, a flexible conduit having an end to be secured in fixed relation relative to said side rail, means for securing said parts together comprising a bracket having a portion formed to receive the end of the conduit and a portion formed to receive an edge of said side rail, a bolt extending through said bracket and through said side rail for holding the end of the conduit in said bracket and for drawing the bracket against the edge part of said side rail.

10. The combination of a side rail of a vehicle frame having a kick-up including an inclined channel shaped part, a horizontally disposed conduit having an end to be secured in fixed relation to said inclined channel part, a bracket for engaging the end of the conduit and the inclined channel part and having a portion formed to receive the end of the conduit in a horizontal position and having an adjacent elongated head portion inclined with the channel part and receiving the edge of one of the side flanges of the channel part, and having an arm extending substantially at right angles to the head portion and secured to the web of the channel part adjacent the other side flange thereof.

11. The combination of a side rail of a vehicle frame having a kick-up including an inclined channel shaped part, a horizontally disposed conduit having an end to be secured in fixed relation to said inclined channel part, a bracket for engaging the end of the conduit and the inclined channel part and having a portion formed to receive the end of the conduit in a horizontal position and having an adjacent elongated head portion inclined with the channel part and receiving the edge of one of the side flanges of the channel part and having an arm extending substantially at right angles to the head portion and secured to the web of the channel part adjacent the other side flange thereof, and means for clamping the end of said conduit in said bracket and for drawing the head of the bracket upon the edge of said first named side flange.

12. The combination of a channel shaped member having a web and side flanges, a bracket to be secured in fixed relation to said channel shaped part and having an elongated head with a V-shaped groove receiving the edge of one of the side flanges and spaced from the web of the channel part, an arm secured at its end to the channel part remote from said side flange, a bolt extending through said bracket and through the web of the channel part near said side flange for forcing the edge of said side flange into said groove, the web of said channel having an aperture through which the bolt passes of greater diameter than the bolt, whereby the need for matching holes in the bracket with holes in the channel part is eliminated.

13. The combination of the side rail of a vehicle frame, a flexible conduit having an end to be secured in fixed relation relative to said side rail, means for securing said parts together comprising a bracket having a portion formed to receive the end of the conduit and a portion formed to receive an edge of said side rail, a J-shaped bolt extending through said bracket and through said side rail and encompassing the end of the conduit and drawing the bracket against the edge part of said side rail and securing the end of the conduit.

In testimony whereof, I hereunto affix my signature.

JOHN SNEED.